United States Patent
Yokoyama et al.

(10) Patent No.: US 7,407,180 B2
(45) Date of Patent: Aug. 5, 2008

(54) AIR BAG APPARATUS AND INSTRUMENT PANEL STRUCTURE FOR SUPPORTING AIR BAG APPARATUS

(75) Inventors: Aki Yokoyama, Shizuoka (JP); Norimasa Goto, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 186 days.

(21) Appl. No.: 11/387,923

(22) Filed: Mar. 24, 2006

(65) Prior Publication Data

US 2006/0220355 A1 Oct. 5, 2006

(30) Foreign Application Priority Data

Mar. 31, 2005 (JP) ............... 2005-103623

(51) Int. Cl.
  *B60R 21/205* (2006.01)
(52) U.S. Cl. .................... 280/728.2; 280/732
(58) Field of Classification Search ............ 280/728.2, 280/728.3, 732
  See application file for complete search history.

(56) References Cited

U.S. PATENT DOCUMENTS

| | | | | |
|---|---|---|---|---|
| 5,393,090 A | * | 2/1995 | Shepherd et al. | 280/728.2 |
| 5,498,025 A | * | 3/1996 | Easter et al. | 280/728.2 |
| 5,681,055 A | * | 10/1997 | Green et al. | 280/728.2 |
| 5,992,875 A | * | 11/1999 | Cundill | 280/728.2 |
| 6,325,415 B1 | * | 12/2001 | Zelinski et al. | 280/743.2 |
| 2005/0225059 A1 | | 10/2005 | Lewis et al. | |
| 2007/0007752 A1 | * | 1/2007 | Rose et al. | 280/728.2 |
| 2007/0007753 A1 | * | 1/2007 | Williams et al. | 280/728.2 |

FOREIGN PATENT DOCUMENTS

| | | | |
|---|---|---|---|
| DE | 19705829 | * | 5/1998 |
| JP | 5-193432 | | 3/1993 |
| JP | 2001-97162 A | | 10/2001 |
| JP | 2003-165409 A | | 10/2003 |

* cited by examiner

*Primary Examiner*—Christopher Ellis
*Assistant Examiner*—Joseph Rocca
(74) *Attorney, Agent, or Firm*—Sughrue Mion, PLLC

(57) ABSTRACT

An air bag apparatus includes a folded air bag, an inflator arranged to discharge a high pressure gas into the air bag at a collision of the vehicle, and a container member receiving the air bag, covering a non-deployment side of the air bag, and retaining the inflator. The container member includes a rigid base plate supporting the inflator and the air bag, covering one part of the non-deployment side of the air bag, and supporting a reaction force of the air bag at a deployment of the air bag, and a flexible panel including a connecting portion connected with the base plate, covering the other part of the non-deployment side of the air bag, and being arranged to restrict inflation of the air bag on the non-deployment side at the deployment of the air bag.

9 Claims, 11 Drawing Sheets

AIR BAG APPARATUS AND INSTRUMENT PANEL STRUCTURE FOR SUPPORTING AIR BAG APPARATUS

BACKGROUND OF THE INVENTION

The present invention relates to an air bag apparatus arranged to protect an occupant at a collision of a vehicle, and an instrumental panel for supporting the air bag apparatus.

The air bag apparatus for absorbing the impact at the collision of the vehicle is installed inside the instrument panel of the vehicle compartment.

In the recent year, the social and technical request to reduce the weight of the overall vehicle is increased. That is, from a viewpoint of social requirement, the reduction in the emission gas of the vehicle is recognized as an important problem for the preservation of earth environment. It is considered that it is the most rational solution to improve fuel economy by the weight reduction of the vehicle. Therefore, it is requested to reduce the weight of whole components of the vehicle, and also the air bag apparatus.

From the viewpoint of the technical request, the air bag apparatuses are mounted to various parts of the vehicle because of the spread of a side air bag, a curtain air bag, and so on. Through the weight of one air bag apparatus does not have great effect, the weight of all the air bag apparatuses mounted on the vehicle can not be disregarded because many air bag apparatuses are mounted on the vehicle. Even if the air bag apparatuses for lessening or losing the occupant's injury may increase in number in the future, it is not thought that the number of the air bag apparatus decreases, therefore the needs for the art for the weight reduction are by no means small.

Moreover, from the viewpoint of the technical request, it is important to downsize the air bag apparatus. The progress of IT (Information technology) applies in the vehicle, and there is a request to bring an operation function and a control function together in the instrument panel. However, even in the conventional vehicles, the instrument panel has devices for vehicle control (for example, ECU), an air conditioner, and control devices for the air conditioner, and audio systems. Moreover, the air bag apparatus is disposed in the instrument panel, and it is in a difficult situation on a layout. In order to add IT devices and so on to such instrument panel, there are needs to miniaturize already-existing built-in apparatus more highly because there is a limit also in the size of an instrument panel naturally from the function.

For this reason, the development for attaining a weight saving, without spoiling the function of the air bag apparatus is progressing, and the air bag device aiming at a weight saving is also proposed, for example with patent documents 1, 2 and 3.

A patent document 1 (Japanese Patent Application Publication No. 2001-97162) shows an air bag apparatus including a folded air bag, a case having an upper chamber opened in an upper surface, and a lower chamber connected with a lower portion of the upper chamber, and an inflator received in the lower chamber.

The case is made of a sheet of metal plate by stamping with deep drawing. The folded air bag is received in the upper chamber.

The case includes a pair of flange portions each formed by bending from a periphery of the upper surface of the upper chamber. These flange portions are fixed to an instrument panel by fastening members to fix an upper part of the case. A bottom portion of the lower chamber is a vehicle body by fastening members to fix a lower part of the case. The case is made of a sheet of the metal sheet, and accordingly it is possible to reduce manufacturing cost and weight of the air bag apparatus.

A patent document 2 (Japanese Patent Application Publication No. 1993 (H05)-193432) shows an air bag apparatus including an air bag, a inflator of cylinder type or bomb type, and a case having a reinforcement frame member made of metal, and a cover member made of resin material, and located inside the reinforcement frame member. The cover member has a substantially U-shaped cross section. The air bag is received in the case.

A fitting hole is formed in a first end surface of the reinforcement frame member. One end of the inflator is inserted from the fitting hole to the reinforcement frame member, and engaged with a keyhole formed in a second end surface of the reinforcement frame member. Consequently, the inflator is fixed to the reinforcement frame member. The inflator serves as a reinforcement member for the reinforcement frame member.

In the apparatus described in the patent document 2, part of the case is skeleton structure, and it is possible to downsize the air bag apparatus without spoiling the intensity of the case.

A patent document 3 (Japanese Patent Application Publication No. 2003-165409) shows an air bag apparatus including a cylinder type or bomb type inflator, a pair of brackets, fixing members, and a separation cloth. Each end of the inflator is fixed to one bracket. Each fixing member connects between upper portions of the brackets. Each end of the separation cloth is retained, by claws, to one fixing member.

The separation cloth is suspended, in the form of U-shape, between the fixing members to cover a lower opening portion between the brackets. The folded air bag is received above the inflator.

The air bag apparatus described in the patent document 3 does not use the conventional metal case, and it is possible to achieve the light weight of the air bag apparatus.

SUMMARY OF THE INVENTION

However, in the air bag apparatus described in the patent document 1, the case includes the upper chamber and the lower chamber, and an overall height of the air bag apparatus becomes high. Accordingly, it is not possible to be employed in a vehicle which is unable to sufficiently ensure a sufficient installation space inside the instrument panel.

In the air bag apparatus patent described in the patent document 2, part of the case is the skeleton structure, and it is possible to reduce the weight. Moreover, the cylinder type inflator is received in the substantially U-shaped bottom portion of the cover member, and it is possible to slightly lower the overall height of the air bag apparatus relative to the air bag apparatus of the patent document 1.

However, there is a limit to lowering the height of the cover member because the cover member receives the air bag.

Moreover, the cylinder type inflator is received in the bottom portion of the cover member, and the height of the cover member may become high in accordance with the type of the inflator. Accordingly, it is not possible to produce a thin air bag apparatus.

On the other hand, the air bag apparatus described in the patent document 3 does not need the case. Accordingly, it is possible to reduce the weight readily, and to lower the overall height of the air bag apparatus.

However, the inflator penetrates at a substantially center portion of each bracket, and there is need for extra increasing the height of the brackets by the diameter of the inflator.

Moreover, the folded air bag is received between the brackets, and is rolled downward of the inflator from the both sides of the inflator. Accordingly, the separation cloth covering the lower opening portion between the brackets receives the reaction force at the inflation of the air bag, and inflates downwards. Therefore, there is need for a space into which the separation cloth inflates, and it is not possible to lower the overall height of the air bag apparatus.

The separation cloth is disposed between the brackets, and portions for fixing the air bag apparatus to the vehicle body are limited to lower portions of the brackets. When the air bag apparatus is mounted to a portion which does not have the vehicle body below the air bag apparatus, there is need for special mounting members to install the air bag apparatus. Accordingly, a number of components for the air bag apparatus is increased, and it is not possible to facilitate the assembly operation.

It is an object of the present invention to provide an air bag apparatus aimed to solve the above mentioned problem, and devised to reduce size, weight, and thickness.

According to one aspect of the present invention, an air bag apparatus comprises a folded air bag, an inflator arranged to discharge a high pressure gas into the air bag at a collision of the vehicle, and a container member receiving the air bag, covering a non-deployment side of the air bag, and retaining the inflator, the container member including a rigid base plate supporting the inflator and the air bag, covering one part of the non-deployment side of the air bag, and supporting a reaction force of the air bag at a deployment of the air bag, and a flexible panel including a connecting portion connected with the base plate, covering the other part of the non-deployment side of the air bag, and being arranged to restrict inflation of the air bag on the non-deployment side at the deployment of the air bag.

DETAILED DESCRIPTION OF THE INVENTION

Figure 1:
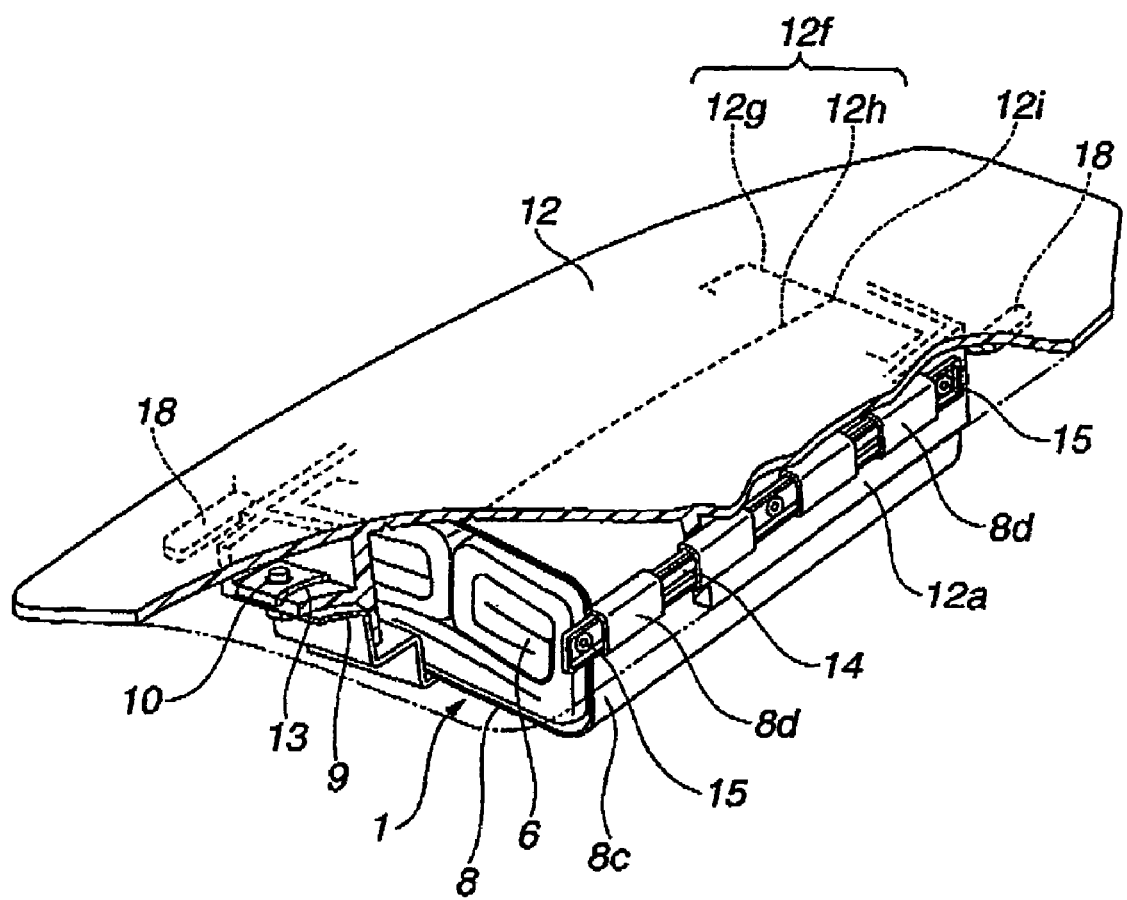
FIG. 1 is a partial cutaway perspective view showing an air bag apparatus according to a first embodiment of the present invention.
Figure 2:
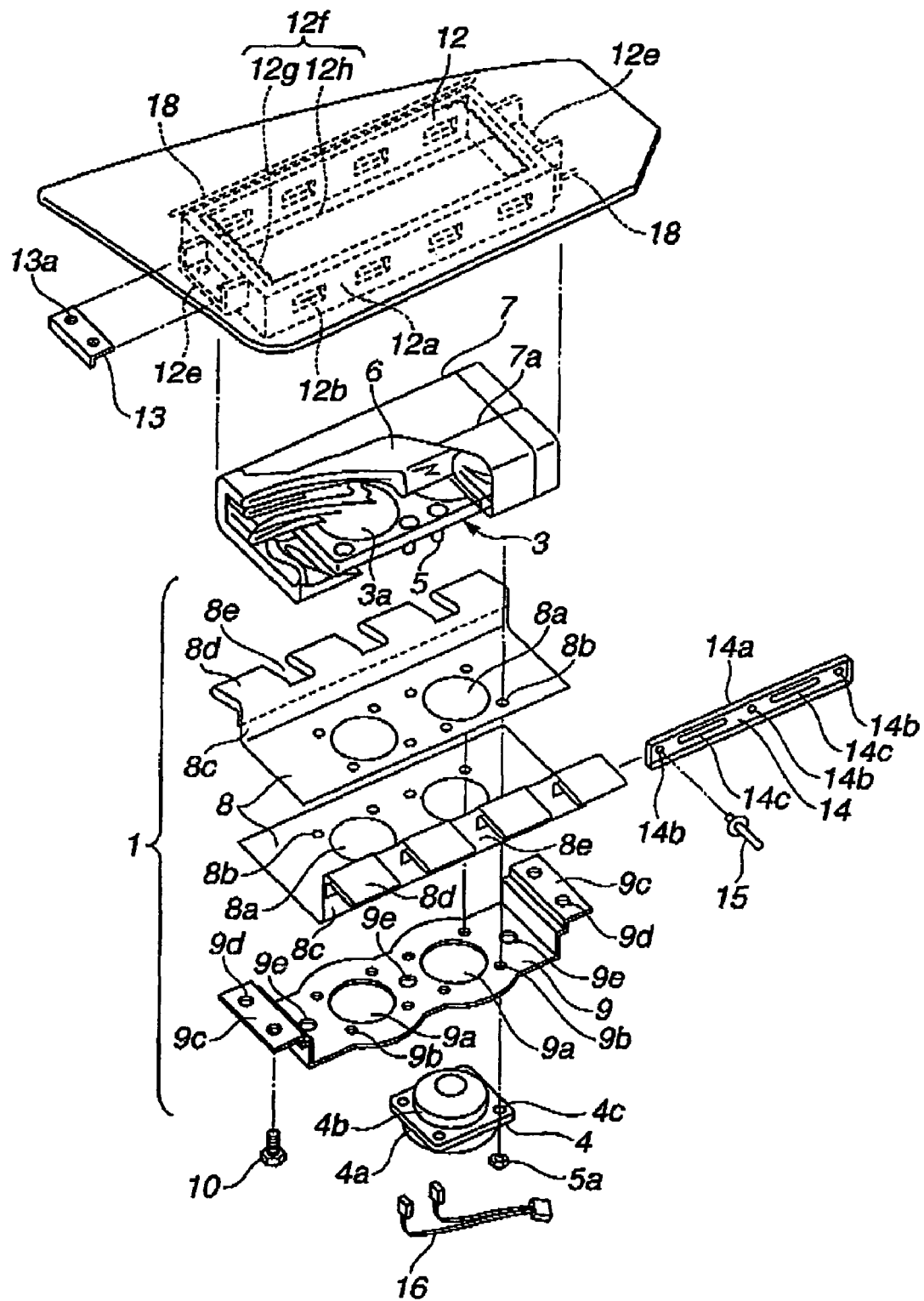
FIG. 2 is an exploded perspective view showing the air bag apparatus of FIG. 3.
Figure 3:
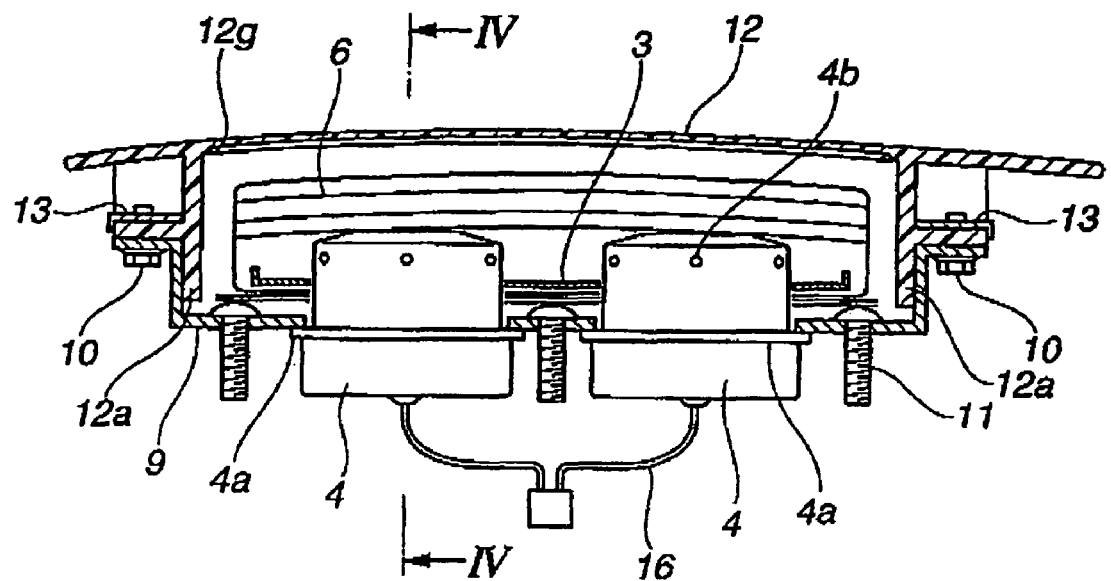
FIG. 3 is a cross sectional view showing the air bag apparatus of FIG. 1.
Figure 4:
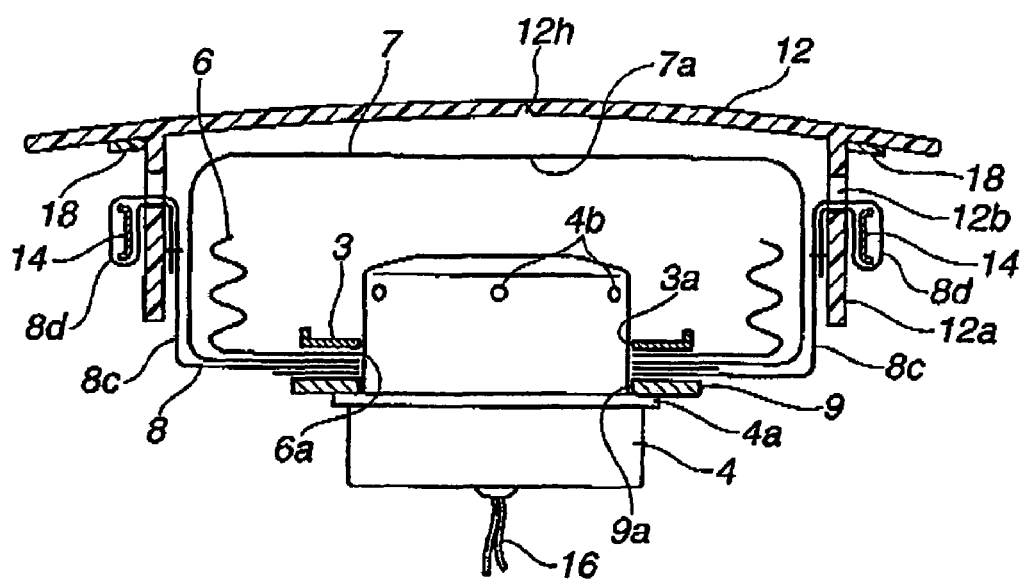
FIG. 4 is an enlarged sectional view taken along a sectional line IV-IV of FIG. 3.
Figure 5:
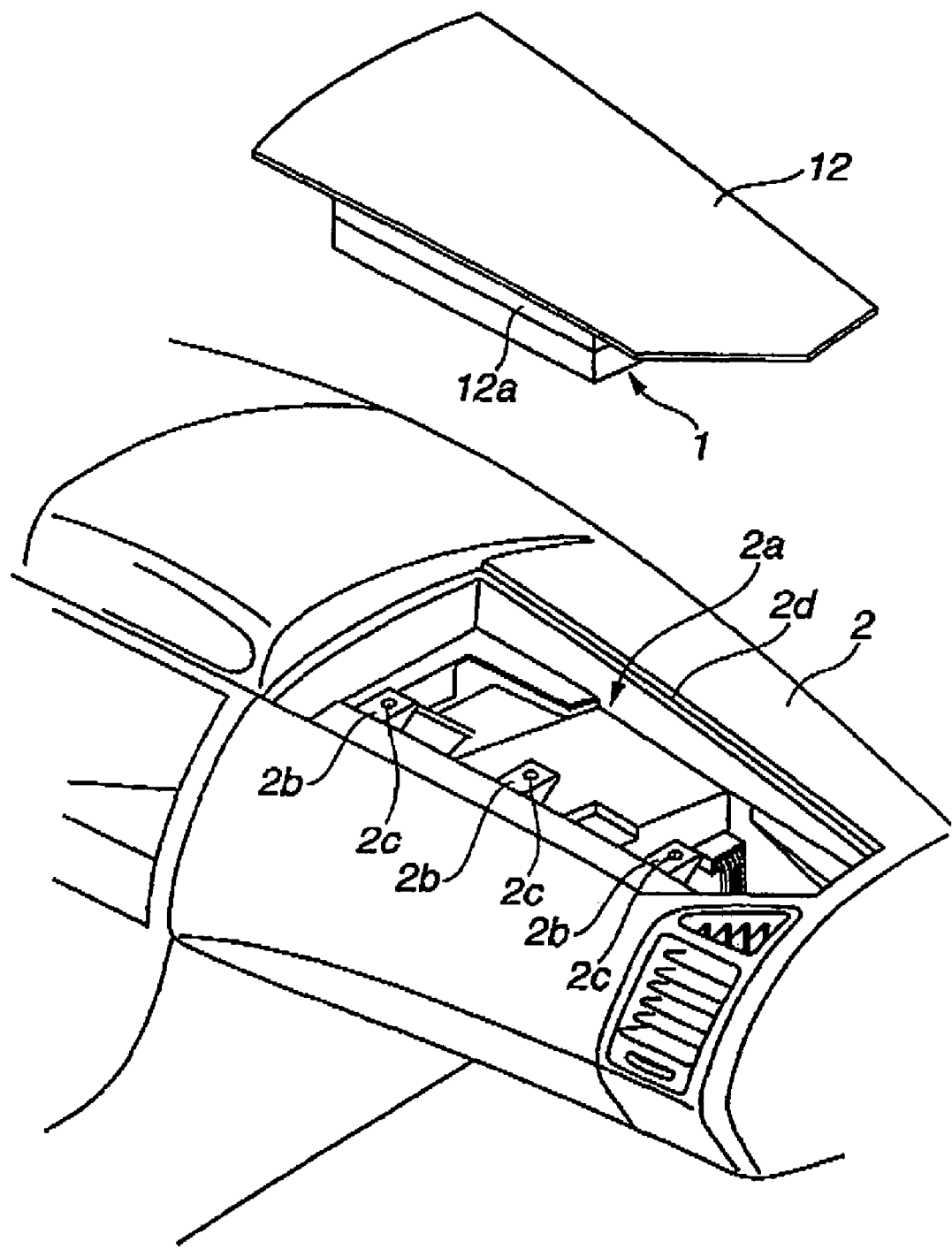
FIG. 5 is a schematic perspective view showing the air bag apparatus of FIG. 1 when the air bag apparatus is attached to an instrument panel.

FIG. 1 shows a partial cutaway perspective view showing an air bag module according to a first embodiment of the present invention. FIG. 2 shows an exploded perspective view showing the air bag module of FIG. 1. FIG. 3 shows a cross sectional view showing the air bag module. FIG. 4 shows a sectional view taken along a section line IV-IV of FIG. 3. FIG. 5 shows a schematic perspective view showing the instrument panel when the air bag module is attached to an air bag receiving portion of an instrument panel.

FIGS. 1~5 show an air bag apparatus for a passenger seat. An air bag module 1 is received in an instrument panel 2 provided forward of the passenger seat (not shown).

Air bag module 1 includes a saucer-shaped retainer 3 of sheet metal formed by press forming.

Retainer 3 is in the form of a rectangle. Retainer 3 is formed with a pair of circular inflator fitting holes 3a arranged at an interval in a longitudinal direction. A plurality of mounting bolts 5 for mounting inflator 4 are provided around inflator fitting holes 3a to protrude downwards.

A folded air bag 6 is mounted on an upper side of retainer 3. A wrapping cloth 7 covers around air bag 6 and retainer 3 to keep the folded shape of air bag 6. Wrapping cloth 7 is made of nylon base cloth, and is in the form of a band. Wrapping cloth 7 is formed with a break line 7a extending along the longitudinal direction of air bag module 1. Break line 7a is in the form of a perforation to break at the inflation of air bag 6.

Air bag 6 is made of non-coated nylon cloth having, for example, substantially 315 denier and 200 g/m² weight. The non-coated nylon cloth is cut into the shape of mushroom. Air bag 6 is formed into the shape of a bag by sewing the periphery of the mushroom-shaped nylon base cloth. Gas supply holes or gas inlet holes 6a are formed in the base cloth located on the lower side at the time of the inflation, to align with inflator fitting holes 3a formed in retainer 3.

Flexible panel is provided below retainer 3 to cover the lower side of air bag module 1. Flexible panel is, for example, a flexible backup member 8 including a first backup member (first flexible sheet) and a second backup member (second flexible sheet).

Backup member 8 is made of non-coated nylon base cloth which has, for example, substantially 315 denier and 200 g/m² weights. Backup member 8 is formed in the shape of a rectangle having a width sufficiently larger than a width of retainer 3. First and second backup members of backup member 8 are superimposed on each other except for one end portion of each backup member. Circular fitting holes 8a are formed in the superimposed portion of backup member 8 to align with inflator fitting holes 3a formed in retainer 3. A plurality of bolt holes 8b are formed around fitting holes 8a. Each of mounting bolts 5 is inserted into one of bolt holes 8b.

Each of first and second backup members of backup member 8 includes a flap portion 8c formed on one end side of each flexible sheet of backup member 8. Each flap portion 8c is formed with cylindrical mounting portions 8d serving as a panel connection portion.

One end portion of each flap portion 8c is turned back, and is sewn in a superposed state. Consequently, each mounting portion 8d is formed in the shape of the cylinder. Adjacent two of mounting portions 8d defines a recessed portion or notch portion 8e, Recessed portions 8e are arranged at intervals in the longitudinal direction, as shown in FIG. 2. One end portion of each mounting portion 8d is protruded from a long hole or oblong hole 12b of a frame portion 12a provided on a lower surface or back surface of a cover panel 12 to protrude downward as described later.

A rigid base plate 9 is provided below backup member 8. Base plate 9 covers non-deployment side area of air bag 6 to support a reaction force of the deployment of air bag 6 with a body construction (body member) described later.

Base plate 9 is made of a substantially rectangular metal sheet which has a length longer than a length of retainer 3. Base plate 9 is formed with inflator fitting holes 9a each aligned with one of inflator fitting holes 3a of retainer 3. Inflator fitting holes 9a of base plate 9 have the size substantially identical to the size of inflator fitting holes 3a. A plurality of bolt holes 9b are formed around inflator fitting holes 9a. Mounting bolts 5 are inserted into bolt holes 9b.

Base plate 9 has a width substantially identical to a diameter (width) of flange 4a of inflator 4. Accordingly, it is possible to ensure strength to sufficiently support the reaction force at the inflation of air bag 6, to possibly decrease the width by removing redundant portions, and to reduce the weight. Base plate 9 includes mounting end portions 9c upwardly folded, in the form of a crank, on the both sides of base plate 9 in the longitudinal direction.

Each mounting end portion 9c is formed with mounting holes 9d. A fastening member or fastener 10 such as bolt is inserted into each of mounting holes 9d to fix base plate 9 on mounting seat portions 12e protruding from the back surface of cover panel 12. Base plate 9 is formed with bolt holes 9e on a center portion thereof, and on both end portions thereof. A fastening member or fastener 11 is inserted into each of bolt holes 9e to fix base plate 9 on mounting seat portions 2b of instrument panel 2.

Inflator 4 is formed in the shape of a disc, as shown in FIG. 2. Inflator 4 includes a plurality of gas discharge holes 4b located on an outer surface of an upper portion thereof, and flange 4a protruding outwards at a center portion. Flange 4a of inflator 4 is formed with a plurality of bolt holes 4c each receiving one of mounting bolts 5 provided in retainer 3.

Thus, retainer 3, backup member 8, and base plate 9 serve as a container member for holding inflator 4.

A harnesses 16 shown in FIG. 2 connects inflator 4 and a collision sensing section (not shown). Two of inflators 4 are usually used, and are identical or similar in shape to each other. Accordingly, one of inflators is shown, and the other of inflators is omitted.

On the other hand, instrument panel 2 forward of the passenger seat is formed with a recessed air bag module receiving portion 2a serving as an air bag apparatus mounting portion, as shown in FIG. 5. Mounting seat portions 2b are provided in air bag module receiving portion 2a to protrude inward. Each mounting seat portion 2b is formed with a bolt hole 2c into which one of fastening members 11 is inserted through one bolt hole 9e of base plate 9. Mounting seat portions 2b are provided through impact absorbing structure (not shown) such as collapsible brackets. Mounting seat portions 2b are arranged in intervals in a widthwise direction of the vehicle. These portions serves as a body member for mounting air bag apparatus 1.

Cover panel 12 covers upper opening portion 2d of air bag module receiving portion 2a. Cover panel 12 is formed by molding a resin having the same color as instrument panel 2. Accordingly, cover panel 12 covers a region on a deployment side of air bag 6, and forms doors by tearing along tear line 12f at the time of the deployment of air bag 6.

Cover panel 12 is fit in opening portion 2d of air bag module receiving portion 2a without clearance, as shown in FIG. 4. Cover panel 12 includes a frame portion 12a protruding from the back surface thereof. Reinforcement members 18 are fixed, for example, by heat caulking, at connection portions between the back surface of cover panel 12 and frame portion 12a.

Frame portion 12a has a substantially square frame shape slightly larger than the folded shape of air bag 6 so as to receive folded air bag 6 by insertion from below. Air bag module 1 is attached to the back surface of cover panel 12 so that a lower end portion of frame portion 12a abuts on both bent portions of base plate 9, as shown in FIG. 3.

Mounting seat portions 12e are provided to protrude outward from the outer surface of frame portion 12a. Mounting end portions 9c abut on mounting seat portions 12e from below. Each fastening member 10 is inserted through one of bolt holes 9d of mounting portions 9c, and screwed into a screw hole 13a of a nut member 13 provided on an upper side of mounting seat portion 9e. Consequently, both ends of base plate 9 are fixed to the back surface of cover panel 12.

Rectangular long holes 12b are formed in a front side surface and a rear side surface of frame portion 12a. Long holes 12b are arranged at intervals substantially identical to the intervals between adjacent two of mounting portions 8d of backup member 8. Cylindrical mounting portions 8d are protruded outwards from long holes 12b, and then retaining rod 14 is inserted into these protruded cylindrical mounting portions 8d, so that mounting portions 8d of backup member 8 are fixed to frame portion 12a. These mounting portions 8d serves as connection portion of backup member 8 to base plate 9.

Retaining rods 14 are made of elongated or long metal sheet, as shown in FIG. 2. Periphery of each retaining rod 14 is folded into L-shape by press or stamping, and formed with a flange portion 14a to increase strength. Each retaining rod 14 is formed with rivet holes 14b on the center portion thereof, and on both end portions thereof.

Rivets 15 are inserted into rivet holes 14b, and retaining rods 14 are retained to frame portion 12a by these rivets 15. Between adjacent two of rivet holes 14b to reduce the weight, there is provided a thinning hole 14c which is in the form of a slit, to reduce the weight.

Tear lines 12f is formed in the back surface of cover panel 12, and tears at the time of the inflation of air bag 6. Tear lines 12f includes longitudinal tear lines 12g and a lateral tear line 12h. Longitudinal tear lines 12g and lateral tear line 12h are in the form of H-shape. Base plate 9 is mounted to cover panel 12 so that intersections 12i of longitudinal tear lines 12g and lateral tear line 12h become near mounting position of the base plate.

Hereinafter, the operation of the above-described air bag apparatus is illustrated.

At the assembling operation of air bag module 1, first, folded air bag 6 is mounted on retainer 3. In this state, wrapping cloth 7 covers air bag 6 and retainer 3 to hold the folded shape of air bag 6.

Next, fitting holes 8a of first and second backup members of backup cloth 8 are aligned with each other in the superposed state, and bolt holes 8b around fitting holes 8a are fit over mounting bolts 5, from below retainer 3. Then, an upper portion of inflator 4 having gas discharge holes 4b is fit, from below, in one inflator fitting hole 9a of base plate 9. Each bolt hole 9b of base plate 9 and the corresponding bolt hole 4c of inflator 4 are fit over one mounting bolt 5 provided to protrude downward from retainer 3. In this state, each nut 5a is inserted into one end of one mounting bolt 5, and tightened. The upper portion of inflator 4 protrudes into air bag 6, as shown in FIGS. 3 and 4, and the periphery of each gas discharge hole 6 is airtightly sandwiched between retainer 3 and base plate 9. Accordingly, it is possible to prevent gas leakage from gas discharge holes 6a when gas discharge holes 4b of inflators 4 discharge high pressure gas into air bag 6.

Next, air bag module 1 is attached to the back surface of cover panel 12. At the mounting of air bag module 1, each cylindrical mounting portion 8d of one end portion of backup member 8 is inserted through one of long holes 12b of frame portion 12a, and to protrude outside frame portion 12a.

In this state, one end of each retaining rod 14 is inserted into cylindrical mounting portions 8d, as shown in FIG. 1. Each rivet 15 is inserted through one rivet hole 14b into a rivet hole (not shown) of frame portion 12a, and riveted or staked. Each retaining rod 14 is retained to the outer surface of frame portion 12a.

Consequently, backup member 8 covers the bottom portion of air bag 6 spreading on both sides of base plate 9, as shown in FIG. 4.

Next, each fastening member 10 is inserted, from below, through one bolt hole 9d of mounting end portions 9c provided on both ends of base plate 9. Then, this fastening member 10 is inserted into one screw hole 13a of one nut member 13, tightened, and air bag module 1 is assembled. In this state, folded air bag 6 is received inside frame portion 12a. The height of base plate 9 becomes substantially identical to the height of lower end of frame portion 12a. Moreover, only the bottomed portion or lower portion of disc type (disc-shaped) inflator 4 protrudes below base plate 9, and it is possible to reduce the thickness of air bag module 1. Moreover, there is no need for the case for receiving air bag 6 and inflator 4, and it is possible to reduce the size and the weight of air bag module 1.

After air bag module 1 is assembled as mentioned above, air bag module 1 is received in air bag module receiving portion 2a formed in instrument panel 2, as shown in FIG. 5. Each fastening member 11 is inserted through one bolt hole 9e of base plate 9 into one bolt hole 2c of mounting seat portions 2b. Each fastening member 11 is tightened, from below mounting seat portion 2b, by a nut (not shown) inserted from an opening located at a position oblique below instrument panel 2 before a glove box is attached. Consequently, base plate 9 of air bag module 1 received in air bag module receiving portion 2a is fixed to instrument panel 2. Cover panel 12 covers upper opening portion 2b of air bag module receiving portion 2a without clearance. Accordingly, air bag module 1 can not be seen from the outside.

Backup member 8 covers the bottom portion of air bag module 1 protruding on both sides of narrow width base plate 9, and can be transformed readily. Accordingly, air bag module 1 can be readily received in air bag module receiving portion 2a even when area of opening portion 2d of air bag module receiving portion 2a is substantially identical to or slightly smaller than area of folded air bag 6. It is possible to reduce time for mounting of air bag module 1, and to facilitate the assembly operation.

In a case in which the instrument panel is assembled, in advance, in sublines (supplier park) adjacent to a final assembly line of the vehicle, by installing internal equipments, it is possible to mount the air bag module to the instrument panel, from a front side (engine side) of the instrument panel, and to carry out the assembly operation of the air bag module by placing upside down. Accordingly, it is possible to improve the flexibility of the assembly operation, and to efficiently utilize the excellent characteristic of the air bag module according to the embodiments of the present invention.

When a collision detecting section senses a collision of the vehicle, inflator 4 discharges the high pressure gas from gas discharging holes 4b into air bag 6. Air bag 6 initiates to inflate, and strongly pushes cover panel 12 upward from below. Consequently, cover panel 12 tears upwards at tear lines 2f, and air bag 6 is deployed to the occupant.

Air bag 6 strongly pushes cover panel 9 upwards from below at the inflation thereof. At this time, air bag 6 tend to inflate downwards by the reaction of the upward push of air bag 6. However, base plate 9 made of sheet metal and backup member 8 hanging between frame portions 12a of cover panel 12 are disposed below air bag 6, and accordingly prevent air bag 6 from inflating downwards. Therefore, it is possible to tear cover panel 12 surely, and to deploy air bag 6 on the passenger side.

Figure 6:
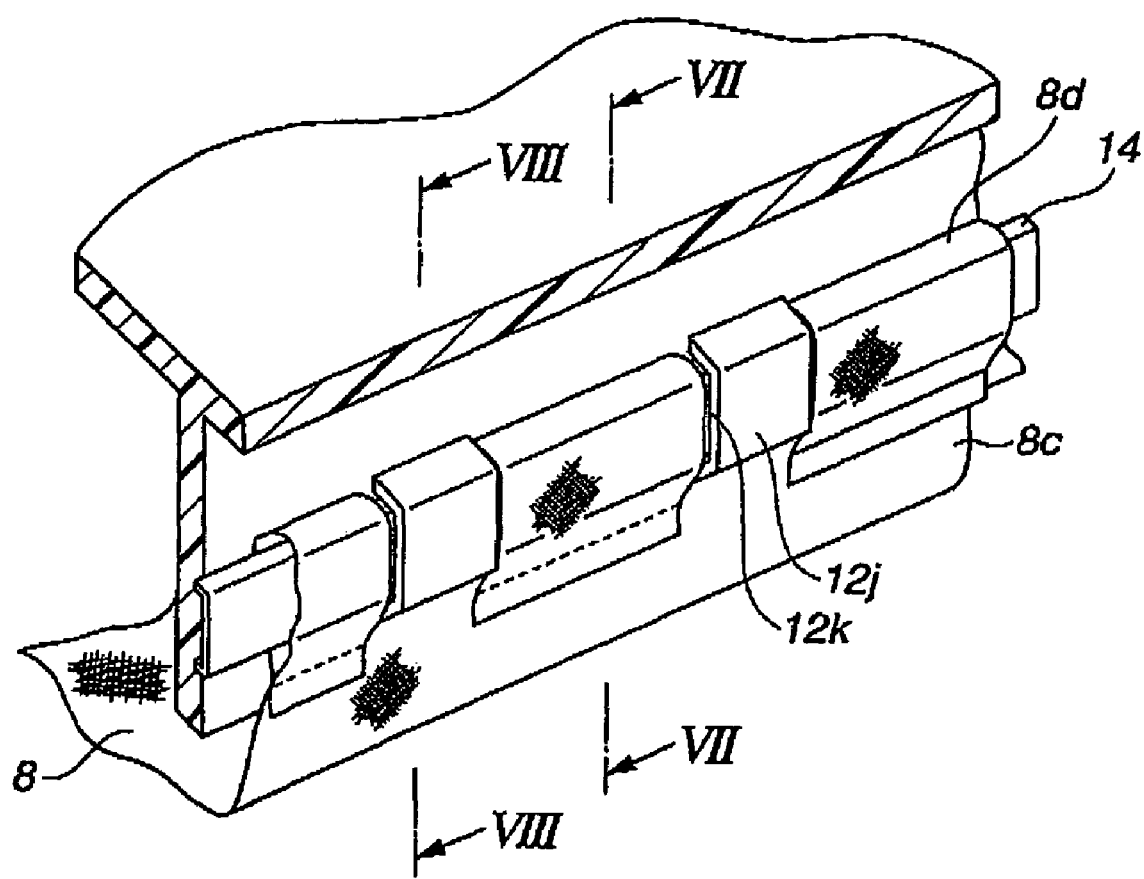
FIG. 6 is a perspective view showing a backup member mounting portion of the air bag apparatus in a first practical example according to the first embodiment of the present invention.
Figure 7:
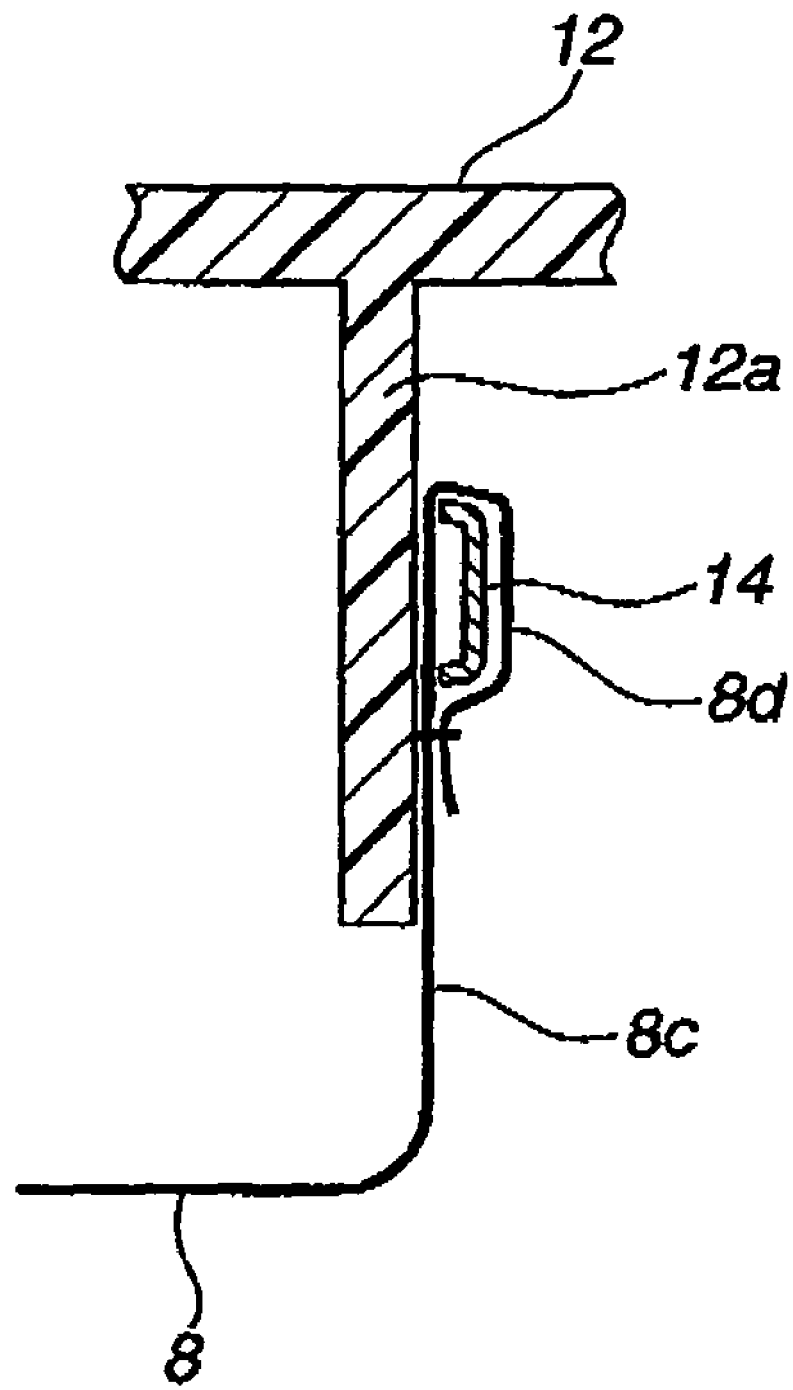
FIG. 7 is a sectional view taken along a sectional line VII-VII of FIG. 6.
Figure 8:
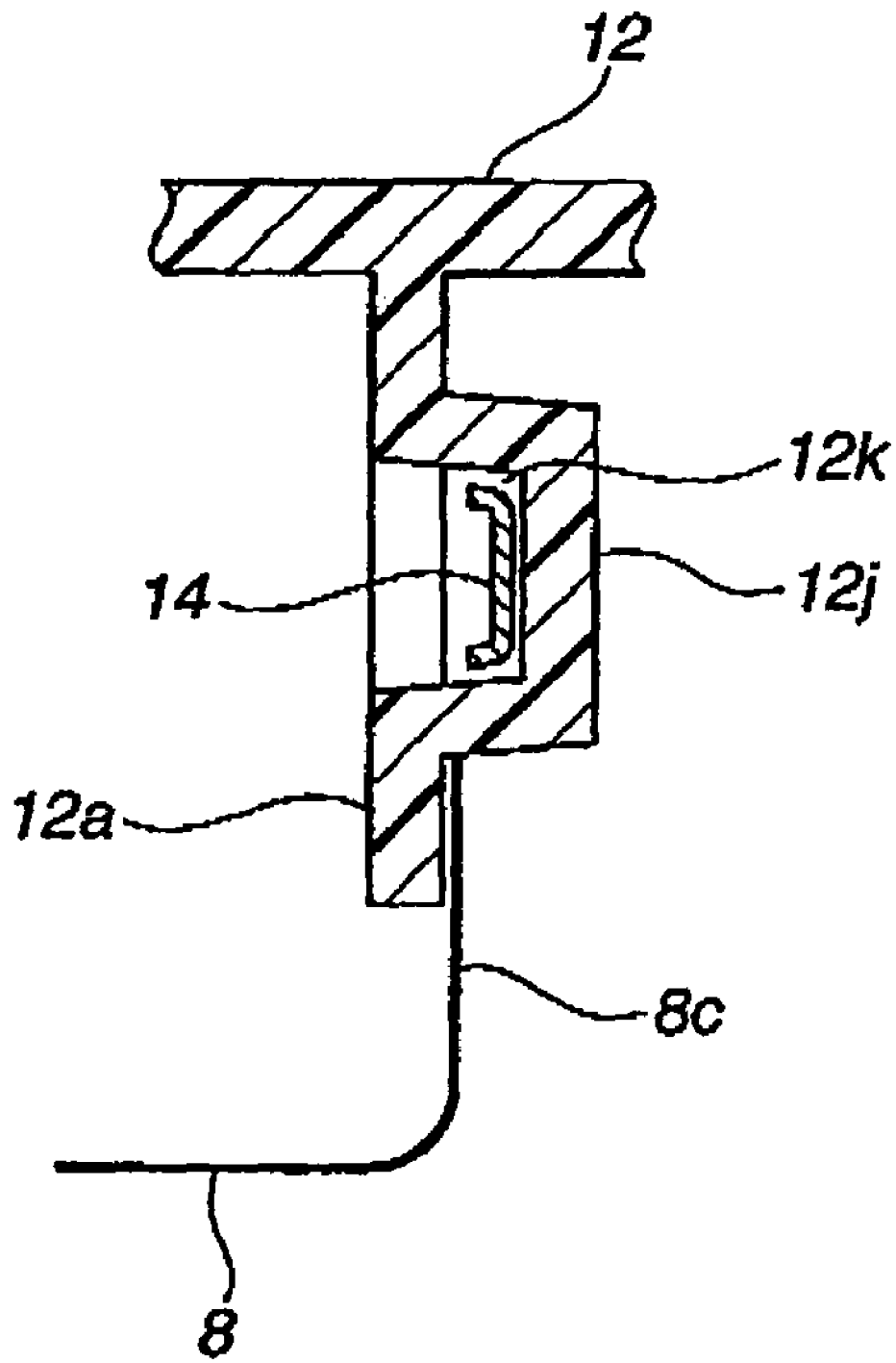
FIG. 8 is a sectional view taken along a sectional line VIII-VIII of FIG. 6.

FIGS. 6, 7 and 8 show one of fixing portions 12j and mounting portion 8d of backup member 8 fixed to frame portion 12a of cover panel 12 in a first practical example according to the first embodiment of the present invention. A plurality of substantially U-shaped fixing portions 12j are provided on the outer surface of frame portion 12a to protrude outwards.

Fixing portions 12j are arranged at intervals identical to the intervals of recessed portions 8e formed between the adjacent two of mounting portions 8d of backup member 8. Each fixing portion 12j is formed with a through hole 12k. Through holes 12k extend horizontally in a line with one another. Each retaining rod 14 passes through through holes 12k and mounting portions 8d, and fixes mounting portions 8d of backup member 8 to frame portion 12a.

In the apparatus according to the first practical example, each retaining rod 14 is supported by fixing portions 12j not to move. Accordingly, it is possible to omit rivets 15 for fixing retaining rod 14 to frame portions.

Figure 9:
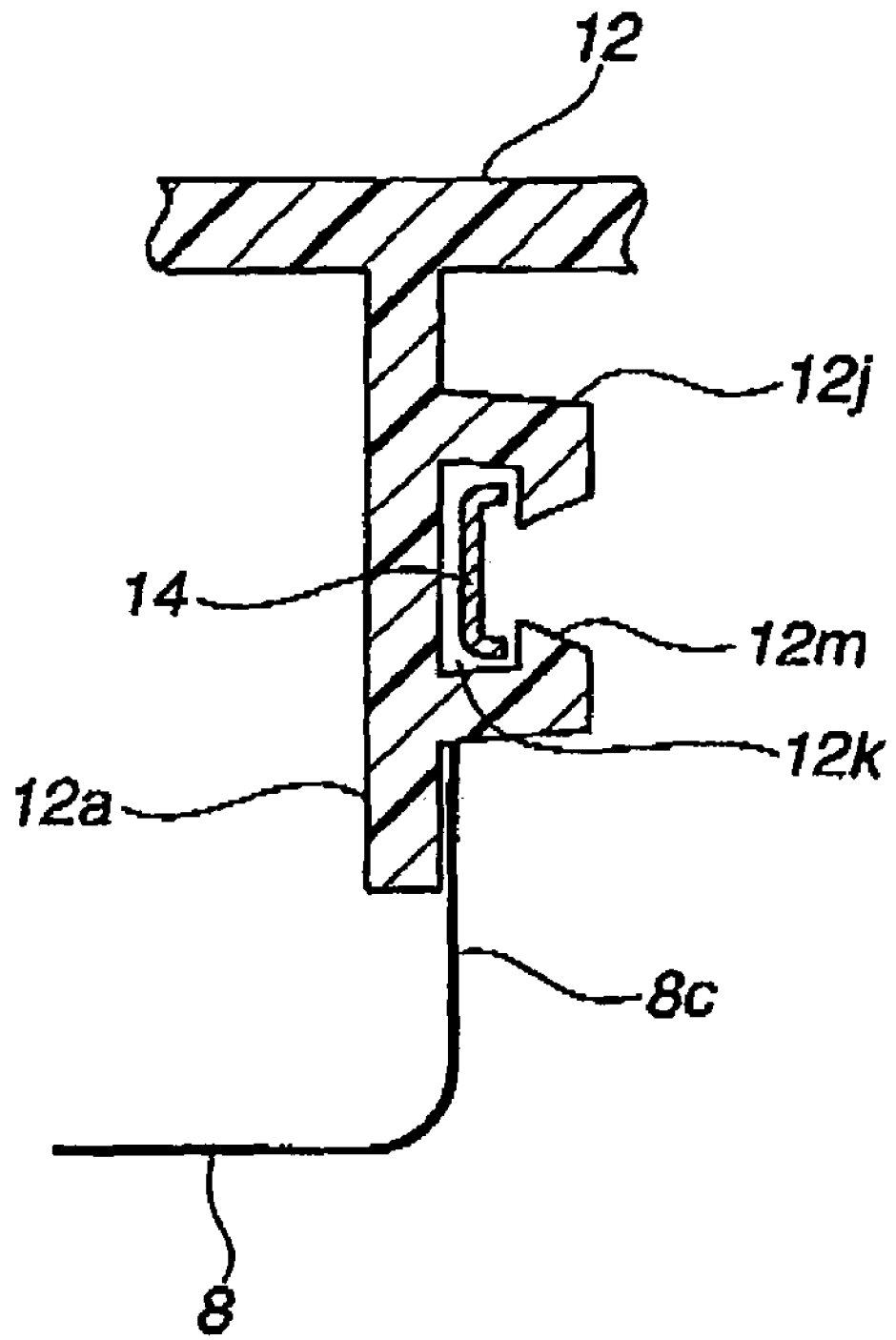
FIG. 9 is a sectional view showing a backup member mounting portion of the air bag apparatus in a second practical example according to the first embodiment of the present invention.
Figure 10:
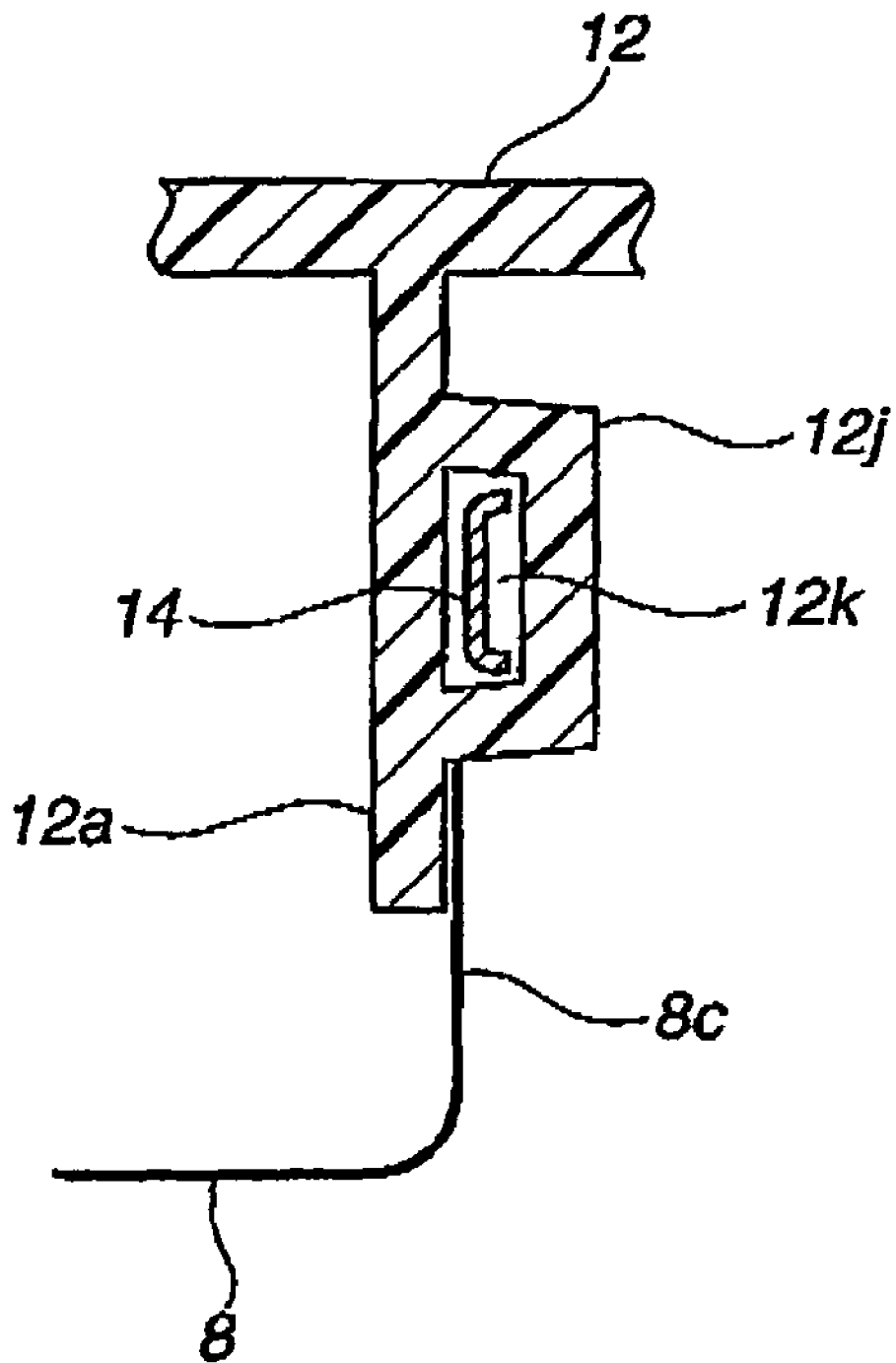
FIG. 10 is a sectional view showing a backup member mounting portion of the air bag apparatus in a second practical example according to the first embodiment of the present invention.

FIGS. 9 and 10 show one of fixing portions 12j in a second practical example according to the first embodiment. Each fixing portion 12j is provided with a notch portion 12m formed in a horizontal portion extending along frame portion 12a. Retaining rod 14 is inserted from notch portions 12m. Subsequently to the insertion of retaining rod 14, it is possible to close notch portions 12m by using heat caulking, as shown in FIG. 10. The operation of the air bag apparatuses according to the first and second practical example is substantially identical to the operation of the air bag apparatuses according to the first embodiment. Accordingly, the explanation of operation is omitted.

Figure 11:
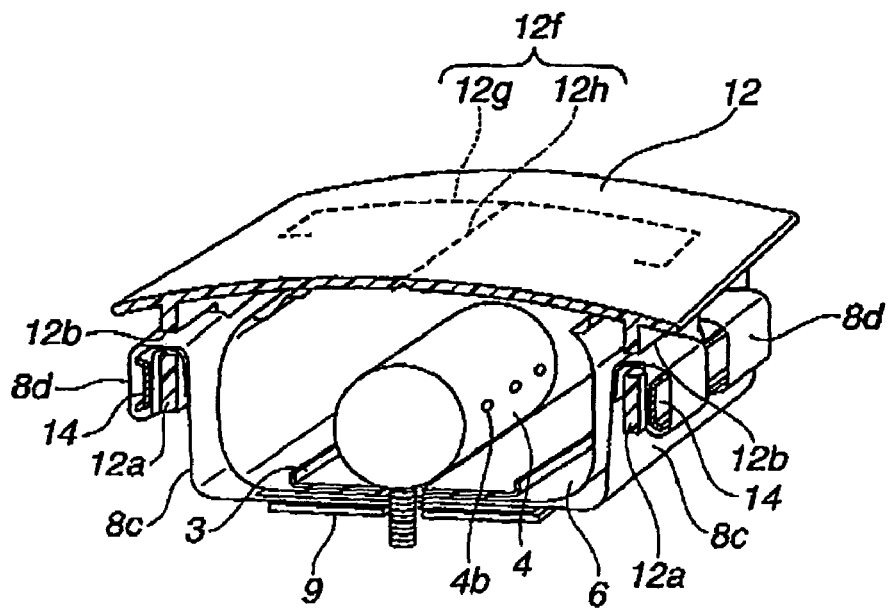
FIG. 11 is a partial perspective cutaway view showing a variation according to the first embodiment of the present invention.

The air bag apparatus according to the first embodiment employs disc type inflator 4, and however it is possible to employ a bomb type (cylindrical) inflator 4 laid on base plate 9, as shown in FIG. 11. Overall height of air bag module 1 with cylindrical inflator 4 becomes slightly higher than overall height of air bag module 1 with disc-shaped inflator 4. However, there are not provided the case and the retainer as conventional apparatus, and it is possible to reduce the size, the weight and the thickness of the air bag apparatus.

Figure 12:
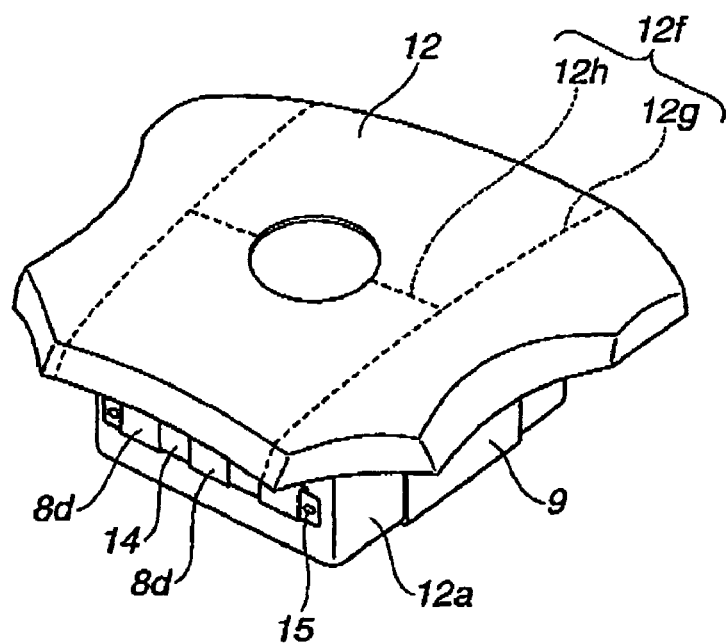
FIG. 12 is a perspective view showing an air bag apparatus according to a second embodiment of the present invention.
Figure 13:
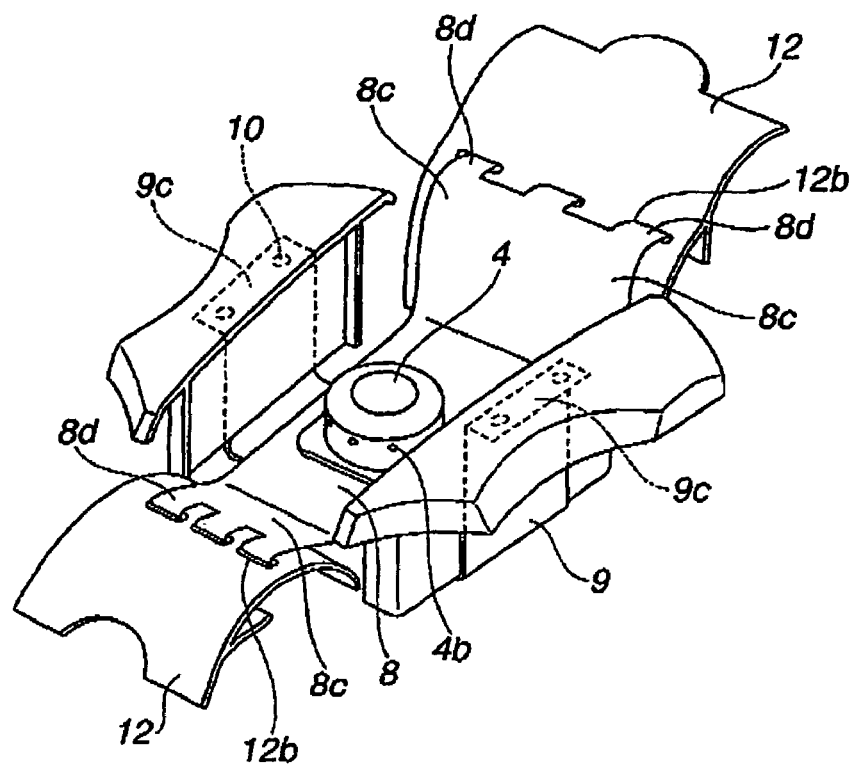
FIG. 13 is a perspective view showing the air bag apparatus of FIG. 12 which is in a deployment state.
Figure 14:
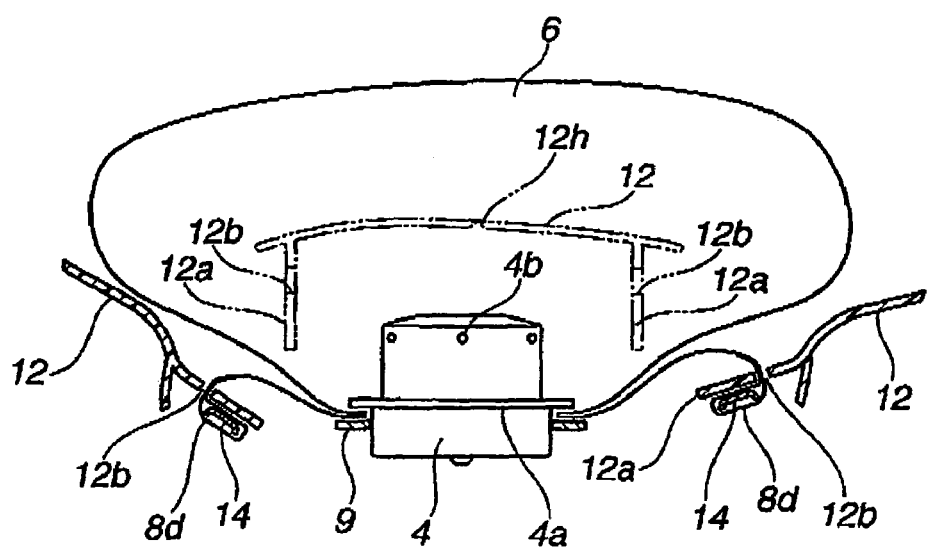
FIG. 14 is a view illustrating operation of the air bag apparatus of FIG. 12.

FIGS. 12~14 show an air bag apparatus for a driver's seat according to a second embodiment of the invention. The air bag apparatus of FIGS. 12–14 is substantially identical to the structure of the air bag apparatus according to the first embodiment of the present invention in most aspects as shown by the use of the same reference numerals.

The air bag apparatus for the driver's seat is disposed at a center portion of a steering wheel (not shown), and accordingly cover panel 12 is in the form of a square, as shown in FIG. 12. Portions to which spokes are mounted are protruded outward.

Frame portion 12*a* is provided on the back surface of cover panel 12 to protrude. Air bag 6, retainer 3, backup member 8, base plate 9, and inflator 4 are inserted from below, inside frame portion 12*a* by the same manner as the first embodiment of the present invention, and thus air bag module 1 is assembled.

In air bag module 1 described above, the bottom is portion of base plate 9 is fixed, by fastening members (not shown), to mounting seat portions (not shown) provided on the steering wheel, and air bag module 1 is mounted to substantially center portion of the steering wheel. When air bag 6 is inflated by the high pressure gas discharged from inflator 4 at the collision of the vehicle, cover panel 12 is deployed by tearing at tear lines 12*f*, as shown in FIG. 13. The inflated air bag 6 is deployed to the driver, as shown in FIG. 14. Accordingly, it is possible to protect the driver from the impact at the collision. Moreover, there is no need for the case arranged to receive air bag 6 and inflator 4, and accordingly it is possible to downsize the air bag apparatus, to achieve the light weight of the air bag apparatus, and to reduce the thickness of the air bag apparatus. Hence, it is possible to reduce moment of inertia of the handle, to position the air bag module at a position remote from the occupant, and to achieve the simple design.

In the air bag apparatus according to the first and second embodiments, base plate 9 is made of the metal material such as steel plate and steel sheet. Moreover, it is possible to use resin material (fiberglass reinforced nylon 66, polysulfone, PPS resin, and so on) with high rigidity, designating as an engineering plastic, and to form base plate 9 with reinforcements such as ribs and so on, by injection molding and transfer molding.

In the air bag apparatus according to the first and second embodiments of the invention, the rigid base plate supports the reaction force acting in the downward direction at the time of inflation of the air bag, and concurrently the flexible panel restricts the air bag from inflating in the non-inflation direction. Accordingly, it is possible to certainly deploy the air bag on the occupant's side. Moreover, there is no need for the case arranged to receive the air bag and the inflator, and it is possible to reduce the size, the weight, and the thickness of the air bag apparatus. It is suitable for the air bag apparatus and so on for protecting the occupant from the impact at the collision of the vehicle.

The air bag apparatus according to the embodiments of the present invention includes a folded air bag, an inflator arranged to discharge a high pressure gas into the air bag at a collision of the vehicle, and a container member receiving the air bag, covering a non-deployment side of the air bag, and retaining the inflator. The container member includes a rigid base plate supporting the inflator and the air bag, covering one part of the non-deployment side of the air bag, and supporting a reaction force of the air bag at a deployment of the air bag, and a flexible panel including a connecting portion connected with the base plate, covering the other part of the non-deployment side of the air bag, and being arranged to restrict inflation of the air bag on the non-deployment side at the deployment of the air bag.

By the above described arrangement, the base plate supports the reaction force acting in the non-deployment direction at the time of the inflation of the air bag. The flexible panel restricts the air bag from inflating in the non-deployment direction. Accordingly, it is possible to deploy the air bag on the occupant's side surely, and to improve the reliability of the air bag apparatus.

Moreover, there is no need for a large case to receive the air bag and the inflator, and it is possible to achieve the miniaturization, the weight reduction, and the thickness reduction of the air bag apparatus. Accordingly, it is possible to easily install in the instrument panel limited in installation space by various electronic devices and so on. Moreover, it is possible to further reduce the thickness of the air bag by using the disc type inflator and so on, and to install in the instrument panel easily. For simple structure in which the narrow width base plate and the backup member cover the lower side of the air bag, it is possible to reduce the cost of the air bag apparatus.

In the air bag apparatus according to the embodiments of the invention, the flexible panel is made of a woven fabric.

By the arrangement described above, it is possible to form a thin, flexible and hard backup member, to reduce the cost of the component, and to reduce the cost of the air bag apparatus.

In the air bag apparatus according to the embodiments of the invention, the air bag apparatus includes a cover panel covering a deployment side of the air bag, and being arranged to form a deployment door at the deployment of the air bag by tearing along tear lines. The base plate includes a base connecting portion connected with the cover panel. The flexible panel includes a panel connecting portion connecting with the cover panel, and the flexible panel spreads between the connecting portion and the panel connecting portion.

By the arrangement described above, the rigid base plate supports the reaction force acting in the non-deployment direction. Concurrently, the flexible panel spreading between the connection portion and the panel connecting portions of the cover panel restricts the air bag apparatus for inflating in the non-deployment direction at the inflation of the air bag. Accordingly, it is possible to deploy the air bag to the passenger's side, and to improve the reliability of the air bag apparatus.

Moreover, the case with large bulk for receiving the air bag and inflator does not need. Accordingly, it is possible to reduce size, weight, and thickness of the air bag apparatus. The air bag apparatus can be installed in the instrument panel significantly limited in installation space for various electrical components and so on. Moreover, it is possible to further reduce a thickness of the air bag apparatus by using the disc type inflator and so on. It is possible to reduce the cost of the air bag apparatus for the simple structure which the narrow width base plate and backup member covers the lower side of the air bag.

In the air bag apparatus according to the embodiments of the invention, the tear lines includes a lateral tear line extending from a first end to a second end, a first longitudinal tear line connected with the first end of the lateral tear line, and a second longitudinal tear line connected with the second end of the lateral tear line. The base connecting portion of the base plate is located at a position near one of the first end and the second end of the lateral tear line.

By the arrangement described above, the force for the tearing is concentrated to the base connection portion around the base plate mounting portion with high strength. Accordingly, it is possible to perform the deployment operation of the air bag apparatus stably, smoothly.

In the air bag apparatus according to the embodiments of the invention, the air bag apparatus includes a reinforcement member provided at an outer circumference of portions defining the deployment door of the cover panel.

By the arrangement described above, the reinforcement members reinforce the outer circumference of portion defining the deployment door of the cover panel. Accordingly, it is possible to suppress the deformation of the cover panel in the up-down direction. Moreover, it is possible to restrain the cover panel from raising in the deployment direction at the inflation of the air bag, and to tear the tear lines surely.

In the air bag apparatus according to the embodiments of the invention, the air bag apparatus includes an instrument panel having a body member; the body member of the instrument panel includes an air bag apparatus mounting portion to which the air bag is mounted, and a mounting seat portion being provided in the air bag apparatus mounting portion. The base plate is mounted through the mounting seat portion to the body member by a fastening member. The base plate supports the reaction force of the air bag with the body member at the deployment of the air bag.

In the air bag apparatus according to the embodiments of the invention, the air bag apparatus mounting portion includes an opening portion. The cover panel is mounted to the opening portion of the air bag apparatus mounting portion so that a surface of the cover panel forms an integral surface with a surface of the instrument panel.

By the arrangement described above, it is possible to receive the air bag apparatus from the opening portion to the air bag apparatus mounting portion, in a state in which the flexible panel is shortened by the press. Even in a case in which the installation space for the air bag is limited for the installation of the various electrical devices and so on, it is possible to carry out the mounting operation of the air bag apparatus readily.

Moreover, the base plate is fixed on the mounting seat portions of the instrument panel, and the strength of the base plate increases by the rigidity of the base plate. Accordingly, it is possible to further achieve the simplicity and the light weight of the base plate, and to achieve the stable deployment characteristic of the air bag.

In the air bag apparatus according to the embodiments of the invention, the rigid base plate supports the reaction force acting in the downward direction at the inflation of the air bag, and concurrently the flexible panel restricts the air bag for inflating in the non-inflation direction. Accordingly, it is possible to deploy the air bag on the occupant's side surely. There is no need for the case to receive the air bag and the inflator. Accordingly, it is possible to reduce the size, the weight, and the thickness of the air bag.

This application is based on a prior Japanese Patent Application No. 2005-103623. The entire contents of the Japanese Patent Application No. 2005-103623 with a filing date of Mar. 31, 2005 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air bag apparatus for a vehicle, the air bag apparatus comprising:
    a folded air bag;
    an inflator arranged to discharge a high pressure gas into the air bag at a collision of the vehicle;
    a container member receiving the air bag, covering a non-deployment side of the air bag, and retaining the inflator; and
    a cover panel covering a deployment side of the air bag, and being arranged to form a deployment door at a deployment of the air bag tearing along tear lines,
    the container member including;
        a rigid base plate supporting the inflator and the air bag, covering one part of the non-deployment side of the air bag, and supporting a reaction force of the air bag at the deployment of the air bag; and
        a flexible panel including a connecting portion connected with the base plate, covering the other part of the non-deployment side of the air bag, and being arranged to restrict inflation of the air bag on the non-deployment side at the deployment of the air bag,
    wherein the flexible panel has a plurality of flap portions each having a plurality of cylindrically shaped mounting portions, and a plurality of recessed portions disposed between the plurality of mounting portions at intervals in a longitudinal direction of the flexible panel, and
    wherein the cover panel includes a frame portion having a plurality of holes arranged at intervals substantially identical to the intervals between the plurality of mounting portions of the flexible panel, so that the plurality of mounting portions protrude through the holes, and a retaining rod is inserted into the plurality of mounting portions in order to fix the plurality of mounting portions to the frame portion.

2. The air bag apparatus as claimed in claim 1, wherein the flexible panel is made of a woven fabric.

3. The air bag apparatus as claimed in claim 1, wherein end portions of the base plate connect with the cover panel.

4. The air bag apparatus as claimed in claim 3, wherein the tear lines includes a lateral tear line extending from a first end to a second end, a first longitudinal tear line connected with the first end of the lateral tear line, and a second longitudinal tear line connected with the second end of the lateral tear line; and each of end portions of the base plate is located at a position near one of the first end and the second end of the lateral tear line, respectively.

5. The air bag apparatus as claimed in claim 3, wherein the air bag apparatus further comprises a reinforcement member provided at an outer circumference of portions defining the deployment door of the cover panel.

6. The air bag apparatus as claimed in claim 1, wherein the air bag apparatus further comprises an instrument panel including a body member; the body member of the instrument panel includes an air bag apparatus mounting portion to which the air bag is mounted, and a mounting seat portion being provided in the air bag apparatus mounting portion; and the base plate is mounted through the mounting seat portion to the body member by a fastening member, and the base plate supports the reaction force of the air bag with the body member at the deployment of the air bag.

7. The air bag apparatus as claimed in claim 6, wherein the air bag apparatus mounting portion includes an opening portion; and the cover panel is mounted to the opening portion of the air bag apparatus mounting portion so that a surface of the cover panel forms an integral surface with a surface of the instrument panel.

8. The air bag apparatus as claimed in claim 1, wherein the fixing portion of the cover panel includes a notch portion; and the retaining rod is inserted through the notch portion into the fixing portion to fix the flexible panel to the frame portion of the cover panel.

9. The air bag apparatus as claimed in claim 1, wherein the flexible panel is a first backup member and a second backup member; and the first backup member and the second backup member cover the other part of the non-deployment side of the air bag.

* * * * *